UNITED STATES PATENT OFFICE.

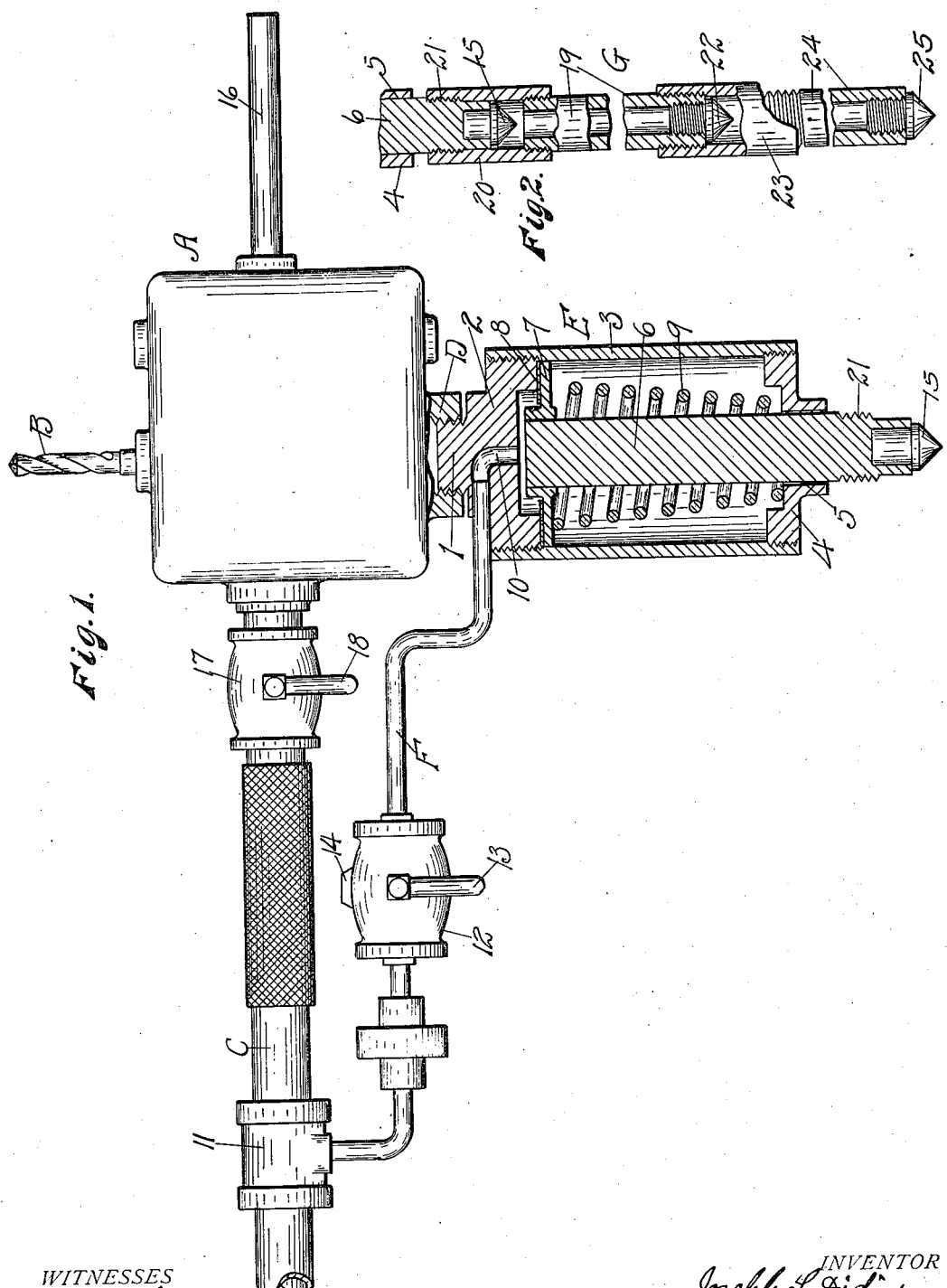
J. L. DIDIER.
DRILLING AND BORING MACHINE.
APPLICATION FILED JULY 18, 1913.
1,142,802. Patented June 15, 1915.

JOSEPH L. DIDIER, OF SALISBURY, NORTH CAROLINA.

DRILLING AND BORING MACHINE.

1,142,802.   Specification of Letters Patent.   Patented June 15, 1915.

Application filed July 18, 1913. Serial No. 779,762.

*To all whom it may concern:*

Be it known that I, JOSEPH L. DIDIER, a citizen of the United States, residing at Salisbury, in the county of Rowan and State of North Carolina, have invented a new and useful Improvement in Drilling and Boring Machines, of which the following is a specification, reference being had to the accompanying drawing.

My improvement relates particularly to power drilling and boring machines which are portable and wherein provision is made for securing the machine in position for its work and to feed the cutting tool forward while the cutting operation progresses.

The object of the invention is to provide convenient and efficient means for performing said two functions and particularly for pressing the cutting tool forward with uniform pressure, in order that the strain upon said tool may be uniform and at no time excessive. Such uniform pressure is necessary for the economical use of power and also to save the tool and the material to be bored from injury.

In the accompanying drawings, Figure 1 is a sectional plan illustrating a machine embodying my improvement; Fig. 2 is a detail showing an extension device.

The portion of the machine bearing the rotatable cutting tool is herein regarded as the front or forward portion of the machine, while the opposite portion is regarded as the rear of the machine. The rear portion of the machine is adapted to rest against an abutment, while an expansion chamber presses the forward portion of the machine forward, whereby the cutting tool is pressed against the material which is to be bored.

Referring to said drawings, A is a motor carrying the cutting tool, B, which is in this case in the form of a rotary drill. Said motor is, in this case, driven by compressed air delivered into the motor through the motor fluid supply pipe, C, from any source of supply. Said motor may be of any desired form, and since such motors are well known in the art, I deem it unnecessary to illustrate and describe the same in detail.

Axially in line with the tool, B, and at the side of the motor opposite said tool, the motor has a socket, D, which is interiorly screw-threaded. Said socket receives an exteriorly screw threaded nipple, 1, on the forward end of the expansion chamber structure, E. The expansion chamber, E, is cylindrical in form and has its axis parallel to and preferably coincident with the axis of the tool, B, the nipple, 1, being on the forward head, 2, of said chamber. The cylindrical or body wall, 3, of the chamber, E, is preferably integral with the head, 2.

At the rear end of the chamber, a rear head, 4, is screw-threaded into the body, 3. Said head, 4, has a central aperture, 5. A piston stem, 6, extends loosely through said aperture and has on its forward end (the end within the chamber) a piston head, 7, which bears a packing ring, 8, making close contact with the interior face of the body wall, 3.

An expanding coiled spring, 9, surrounds the stem, 6, between the chamber head, 4, and the piston head, 7, and tends to push said piston head forward against the forward chamber head, 2. For driving said piston head and said stem rearward, in opposition to the action of the spring, fluid is forced at the will of the operator, into the space between the forward chamber head, 2, and the piston head, 7. For this purpose, an expansion chamber supply pipe, F, is connected by one end to the nipple, 1, so as to communicate with the passage, 10, which extends through the nipple, 1, and the head, 2. The opposite end of said pipe is put into connection with any source of fluid under pressure. The drawings show such end entering a coupling, 11, on the motor supply pipe, C.

On the supply pipe, F, is a cut-off valve, 12, having a handle, 13, and a waste port, 14. Said valve is of any form adapted to make a continuous passage through the pipe, F, or to cut off flow from the pipe, C, and permit waste from the expansion chamber through the portion of the pipe, F, which is between said chamber and said valve and through the waste port, 14.

When the handle, 13, is so turned as to make a continuous passage through the pipe, F, the fluid passes through said pipe and bears upon the forward face of the piston head and drives the latter rearward or away from the head, 2, against the action of the spring, 9. When the handle is again turned so as to cut off the continuous passage through said pipe and so as to permit waste or exhaust through the port, 14, the spring drives the piston head forward and the latter drives the fluid through the portion of the pipe, F, between the expansion chamber and the valve and thence through the exhaust port, 14.

The fluid may be water, steam, air, or any other liquid, vapor, or gas. In practice, I have used air, the motor, A, being also driven by air going through the pipe, C.

It is to be noted that during the operation of the machine the expansion chamber takes air from the pipe, C, only to the extent of the capacity of the portion of the pipe, F, between the valve, 12, and the expansion chamber plus the capacity of the space between the chamber head, 2, and the piston head, 7. The distance between said heads is increased while the work advances and the air taken from the pipe, C, through the pipe, F, is only so much as is needed to fill the increasing space, under pressure, between said heads. When the valve, 12, is closed, that much air goes out through the waste port and is lost.

On the rear end of the piston stem (the end which projects through the expansion chamber) is a point or tip, 15, which is adapted to bear against any abutment which is located conveniently for setting the machine. Such abutment may be a wall in a boiler or tank or other similar structure, or the abutment may be any block or other member temporarily set immovably. Such abutment should be near enough the material to be bored to bring the tool, B, nearly to the material to be bored or drilled.

For putting the machine into position, the hands of the operator take the pipe, C, and the handle, 16, on the motor and move the machine bodily until it is in the desired position, with the point, 15, bearing against the abutment or with the tool, B, bearing against the point at which the hole is to be started. Then the handle, 13, is turned for opening the valve, 12. Then the fluid passing through said pipe moves the piston head, 7, away from the head, 2, of the expansion chamber. By this means, the distance between the point, 15, and the point of the tool, B, is increased until both of said points are engaged. While the boring is in progress, the pressure of the fluid continues on said piston head, whereby the tool, B, is constantly pressed against the material to be bored, until said head reaches its rear limit or until the valve, 12, is again closed. The valve, 12, is preferably located so near the motor supply pipe, C, as to permit the moving of the handle, 13, by the operator's hand which grasps said pipe, C.

On the pipe, C, adjacent the motor, A, and between the latter and the coupling, 11, is a cut-off valve, 17, having a handle, 18. This arrangement allows the operating of the expansion chamber while the motor is at rest. It also allows the delivery of air for the driving of the motor while the valve, 12, on the expansion chamber supply pipe, F, is closed, for the operation of the motor and drill tool without the operation of the expansion chamber.

For a given fluid pressure, the force exerted by the expansion chamber may be varied by varying the diameter, and consequently the area, of the piston head.

In Fig. 2, I show an extension, G, which is to be used for lengthening the machine when the distance between the material to be bored and the abutment is longer than the distance between the point of the tool, B, and the tip, 15. Said extension is detachably secured to the outer end of the piston stem, 6. An ordinary gas pipe, 19, has on one end an ordinary sleeve-form coupling, 20, which is interiorly screw-threaded and engages exterior threads on said pipe, 19. The opposite end of said coupling is also interiorly screw threaded and engages threads, 21, on the piston stem. The threaded portion of said stem is a little forward of the end of the latter, and the portion rearward of said threaded portion is of smaller diameter than said threaded portion so that the valve stem is at all times ready to receive the coupling, 20, without disturbing the tip, 15. The pipe, 19, may be of any desired length and a tip, 22, similar to the tip, 15, is shown threaded into the rear end of said pipe. The extension, G, is shown made still longer by the addition of a pipe, 24, to the rear end of the pipe, 19, by means of a coupling, 23, threaded around the rear end of the pipe, 19, and around the forward end of the pipe, 24, a tip, 25, similar to the tip, 22, being threaded into the rear end of the pipe, 24. When the pipe, 19, and the coupling, 20, do not make the extension long enough, the coupling, 23, and the pipe, 24, are added.

I claim as my invention,

1. In a machine of the nature described, the combination of a rotatable cutting tool, a forward portion comprising a motor for supporting and rotating said tool, a handle joined to said forward portion for holding said machine, means on said handle adjacent said forward portion for manually controlling said motor, a rear portion adapted to bear against an abutment, a fluid-actuated expansion chamber for pressing said forward portion forward, a supply pipe adjacent said handle and leading to said expansion chamber, a manual cut-off valve located on said supply pipe adjacent said handle and having an exhaust port, whereby said cut-off chamber and the means for controlling said motor may be conveniently reached by the hand which holds said handle, substantially as described.

2. In a machine of the nature described, the combination of a rear portion adapted to bear against an abutment, a rotatable cutting tool, a forward portion supporting said tool, a fluid-actuated expansion chamber for pressing said forward portion forward, a fluid motor for rotating said cutting tool, a supply pipe leading to said motor and constituting a handle for holding the machine, and a branch pipe leading from said supply pipe to said expansion chamber, said supply pipe and said branch pipe being provided with cut-off valves adjacent each other and adjacent said forward portion, substantially as described.

In testimony whereof I have signed my name, in presence of two witnesses, this 10th day of July, in the year one thousand nine hundred and thirteen.

JOSEPH L. DIDIER.

Witnesses:
J. C. BEAN,
Z. V. TREXLER.